United States Patent
Inamdar et al.

(10) Patent No.: US 8,015,282 B2
(45) Date of Patent: Sep. 6, 2011

(54) SYSTEM AND METHOD TO SYNTHESIZE CUSTOM METRIC ATTRIBUTES FROM A SET OF METRIC ATTRIBUTES ASSOCIATED WITH AN APPLICATION IN AN APPLICATION SERVER ENVIRONMENT

(75) Inventors: Rajendra Inamdar, N. Chelmsford, MA (US); Franklin Simpson, Ipswich, NH (US); Sandeep Shrivastava, Westford, MA (US); Michael Cico, Hampton, NH (US); Richard P. Mousseau, Stratham, NH (US)

(73) Assignee: Oracle International Corporation, Redwood Shores, CA (US)

( * ) Notice: Subject to any disclaimer, the term of this patent is extended or adjusted under 35 U.S.C. 154(b) by 297 days.

(21) Appl. No.: 12/354,735

(22) Filed: Jan. 15, 2009

(65) Prior Publication Data
US 2009/0182880 A1    Jul. 16, 2009

Related U.S. Application Data

(60) Provisional application No. 61/021,254, filed on Jan. 15, 2008.

(51) Int. Cl.
*G06F 15/173*    (2006.01)
*G06F 15/16*    (2006.01)

(52) U.S. Cl. ........ 709/224; 709/202; 709/223; 709/225; 709/230

(58) Field of Classification Search .......... 709/202–203, 709/220–226, 230
See application file for complete search history.

(56) References Cited

U.S. PATENT DOCUMENTS

| | | | | |
|---|---|---|---|---|
| 6,363,421 B2* | 3/2002 | Barker et al. | | 709/223 |
| 6,487,590 B1* | 11/2002 | Foley et al. | | 709/223 |
| 7,827,535 B2* | 11/2010 | Maron | | 709/223 |
| 2003/0088672 A1* | 5/2003 | Togasaki | | 709/226 |
| 2009/0193408 A1* | 7/2009 | Ok et al. | | 709/220 |

\* cited by examiner

*Primary Examiner* — Bharat Barot
(74) *Attorney, Agent, or Firm* — Fliesler Meyer LLP

(57) ABSTRACT

A system and method for synthesizing custom metric attributes from available attributes. The system includes an application server that exposes available metric attributes of a MBean. A network console displays for selection the metric attributes of the MBean on a navigation tree and a view panel is located on the network management console where the metric attributes are dragged. The console and view panel allow network administrators to review monitoring data collected exposed by the application server. Custom attributes are created by combining attributes made available by the application server and can be combined to synthesize a custom expression that can be made available to other managed servers on the application server.

20 Claims, 19 Drawing Sheets

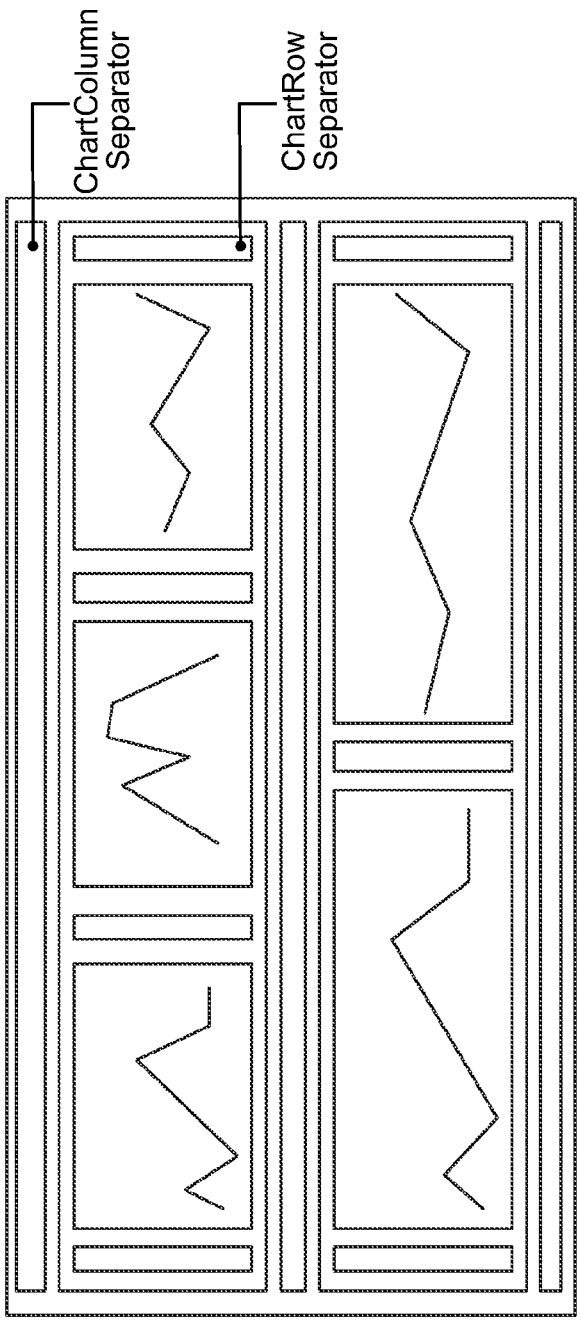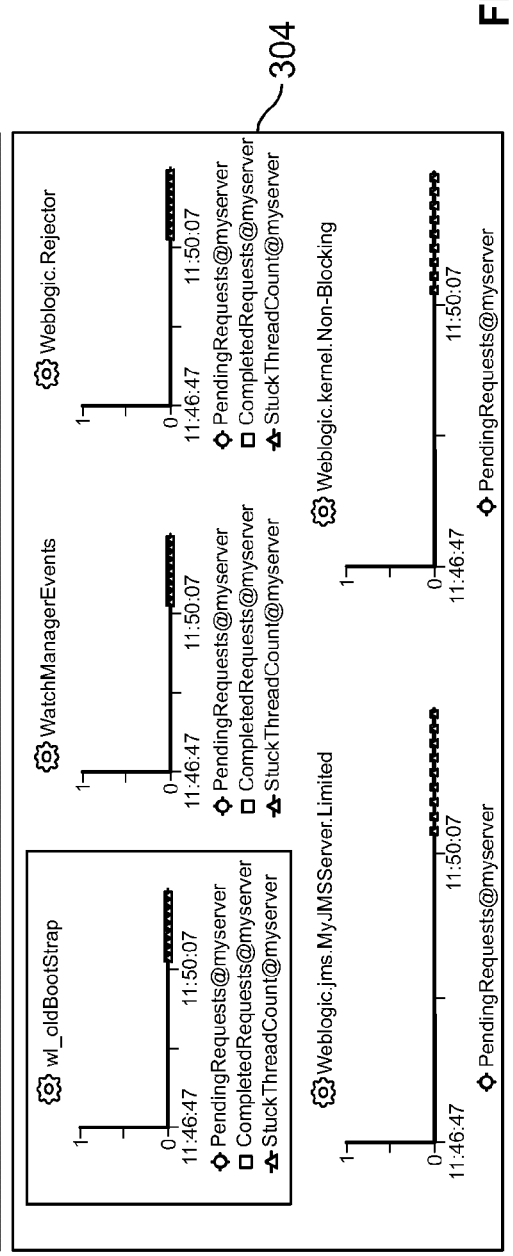
FIGURE. 13

Custom Metric Editor for Type: JVMRuntimeMBean

Metric Name: CustomMetric#2

Available Functions:

| | | |
|---|---|---|
| Abs(<MP>) | Max(<MP>) | Ratio(<MP>),<MP>) |
| Change(<MP>) | Mean(<MP>) | Ratio(<MP>,NumericValue) |
| Change(<MP>,Interval) | Median(<MP>,Interval) | Sum(<MP>,<MP>) |
| Count(<MP>) | Min(<MP>) | Sum(<MP>,NumericValue) |
| Difference(<MP>,<MP>) | Negative(<MP>) | StandardDeviation(<MP>) |
| Difference(<MP>,NumericValue) | Over(<MP>,Threshold) | Summation(<MP>) |
| HighMode(<MP>,Interval) | Over(<MP>,<MP>) | Under(<MP>,Threshold) |
| Inverse(<MP>) | Product(<MP>,<MP>) | Under(<MP>,<MP>) |
| LowMode(<MP>,Interval) | Product(<MP>,NumericValue) | |

Expression:

<MP>

☐ Show Insert Areas

[ Cancel ]  [ Save As ]  [ Save ]

SYSTEM AND METHOD TO SYNTHESIZE CUSTOM METRIC ATTRIBUTES FROM A SET OF METRIC ATTRIBUTES ASSOCIATED WITH AN APPLICATION IN AN APPLICATION SERVER ENVIRONMENT

CLAIM OF PRIORITY

This application claims the benefit of priority to U.S. Provisional Patent Application No. 61/021,254, titled "SYSTEM AND METHOD FOR USING SNMP IN AN APPLICATION SERVER ENVIRONMENT", filed Jan. 15, 2008, which is hereby incorporated by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The present disclosure relates generally to network management, and particularly to an administrative tool that allows network administrators to review monitoring data collected by an application server.

BACKGROUND

In some Java-based application server environments, a static data structure referred to as a Management Information Base (MIB) is used to describe the different Java beans that the application server exposes. Managed beans (often referred to as MBeans, or custom MBeans) can be created and used by an administrator or application server "customer" to manage applications or services which have been recently deployed onto the application server. In some instances this management can be performed using a network-manager, the Simple Network Management Protocol (SNMP), and one or more SNMP Agents.

However, the network-manager and the SNMP Agent which are associated with a particular application server generally cannot recognize the custom MBeans as SNMP managed resources. A consequence of this is that the network-manager cannot monitor or control custom MBeans, and the attributes which the custom MBeans expose cannot be used within the application server.

Another feature of some Java-based application server environments is that server monitoring information can be exposed through a Java Management Extensions (JMX) interface. JMX provides layered tools and interfaces for managing and monitoring applications, including those deployed on an application server. A JMX layer can receive monitoring information from a MBean server. Within a particular domain, a network-manager's SNMP Agent communicates with other agents in the domain to share information.

Additionally, in a traditional application server, a single SNMP Agent runs within an application server instance, and a network-manager is used to provide a limited view of the domain at a given moment in time. However, generally the network-manager is not continually communicating with managed servers in the domain and in the event of a configuration change at runtime, the application server must be restarted to update the managed servers with the change. Moreover, in many cases the network-manager is either not running or not present on the application server. In these instances, the network-manager may not be able to monitor and communicate with several of the other managed servers on the same domain.

Furthermore, current SNMP protocol standards specify security features that use community strings, which in turn are transmitted as plain text. Because of this, sensitive application server configuration and runtime information can be easily exposed to attackers.

In addition to these nuisances, security aspects such as authentication and privacy must be configured individually for each SNMP Agent on a managed server. Configuring the network-manager to communicate with the agents on the managed servers is a cumbersome task if the domain contains many managed servers.

These and other aspects of server management are areas that embodiments of the present invention are designed to address.

SUMMARY

In accordance with an embodiment, a system is described in which each managed server instance in the domain will have its own SNMP Agent. The administration server's SNMP Agent will provide a domain wide view based on the domain MBean server. The managed server's SNMP Agent will surface the MBean server for that server and can monitor applications on that server. Since there is a SNMP Agent deployed on each managed server, the network-manager has a domain wide view of the application server, and all monitored information is centralized on the network-manager.

In accordance with another embodiment, SNMP Agents on managed servers can act as a master agent to which sub-agents can register. This will enable other platform products to instantiate their own agent independent of an application server and to register it as a sub-agent. Since applications can register their own agent to a sub-agent on a managed server, user-defined MBeans are available to other resources on the application server via SNMP by creating entries into the application server MIB.

In accordance with another embodiment, a system is described in which SNMP provides increased security and support for both Transmission Control Protocol/Internet Protocol (TCP/IP) and Universal Datagram Protocol (UDP) protocols by defining security aspects such as authentication and privacy. This allows user authentication, privacy and authorization based on application server security configuration as opposed to the limited community string based security provided in previous releases of SNMP.

In accordance with another embodiment, the security aspects of SNMP are centralized. In configuring the security aspects, each managed server on the application server can host its own SNMP Agent. The SNMP manager, which monitors all SNMP Agents, can communicate directly to the individual SNMP Agents on each managed server to get monitoring data. Embodiments of the present invention centralize this configuration. Credential information is configured across the domain in one location, which allows all SNMP Agents on the application server domain to share information.

In accordance with an embodiment, a system comprises a "dashboard" application, which is an administrative tool that runs from a network management console. The dashboard allows network administrators to review monitoring data collected from the different MBeans exposed by the application server. This data includes metric attributes from MBeans which are exposed by the application server.

In accordance with an embodiment, metric attributes are identified by browsing through a navigation tree that the dashboard provides. The top level identifies different types of MBeans the application server provides. Below the top level are the different instances of the particular MBean. The dashboard also displays the available attributes that the application server monitors for that particular MBean. For example, a MBean can expose metric data about the Java Virtual Machine (JVM) environment upon which the application server is currently executing. This type of information exposed may include heap_size and current_heap_usage. These attributes can be dragged into the dashboard console's view panel.

Attributes exposed by MBeans on an application server are referred to herein as intrinsic attributes. Particular MBeans define certain attributes that a network administer may want to combine to synthesize a custom attribute. Custom attributes are not defined by a MBean in the logic server, but can be synthesized during runtime by combining different intrinsic attributes together into an expression. For example, a MBean may expose attributes heap_size and current_heap_usage. To create the custom attribute free_heap, the system administrator can direct the console to take the difference of these two attributes. In addition to building custom expressions in terms of attributes that are already exposed by the network manager, custom attributes may be synthesized by nesting custom attributes with other custom attributes or attributes intrinsic to the administration server.

In accordance with another embodiment, the dashboard provides data which is used to build custom attributes. Attributes are available as intrinsic attributes from a MBean type, such as heap_free and total_heap. The dashboard also provides a set of intrinsic functions, such as difference, minimum, maximum, absolute value and average. Custom expressions are created by drag and drop of the intrinsic functions and intrinsic attributes from the MBean type into the metric editor. These functions can be saved as a custom metric. Once saved the custom metric becomes available, like any other attribute on a MBean, to other managed servers on the application server, and can be used to synthesize other expressions.

These and additional features and advantages are described in further detail below.

BRIEF DESCRIPTION OF THE FIGURES

FIG. 13 shows a screenshot of a dashboard in accordance with an embodiment, illustrating a view layout with multiple charts.

FIG. 15 shows a screenshot of a custom metric editor in accordance with an embodiment, as it may be used to edit a custom metric.

DETAILED DESCRIPTION

In accordance with an embodiment, a system is described in which each of a plurality of managed servers hosts a SNMP agent that can communicate with an SNMP Agent on an administration server. This allows a network-manager to access SNMP Agents hosted on managed servers. Since there is a SNMP Agent running within the managed server, the SNMP Agent on the managed server can make use of a local MBean server that is also running on the managed server, and monitor applications on that server. Furthermore, since there is a SNMP Agent deployed on each managed server, the network-manager has a domain wide view of the application servers, and all monitored information is centralized on the network-manager's SNMP Agent.

In accordance with an embodiment, each SNMP Agent on a managed server will act as a master agent to which sub-agents can register. This will allow other platform products to instantiate their own SNMP Agent independent of the application server and register it as a sub-agent. A MIB hosts MBeans defined by customers. The dynamic MIB differs from a MIB for application server MBeans in that it is defined at runtime. Since other platform product's can register their own agent to a sub-agent on a managed server, entries can be created in the application server MIB by exposing the attributes of customer defined MBEANS to SNMP. This allows user-defined MBeans within the application server framework to be made available to other resources on the application server, and allows the application server MIB to be extended dynamically.

Figure 1:
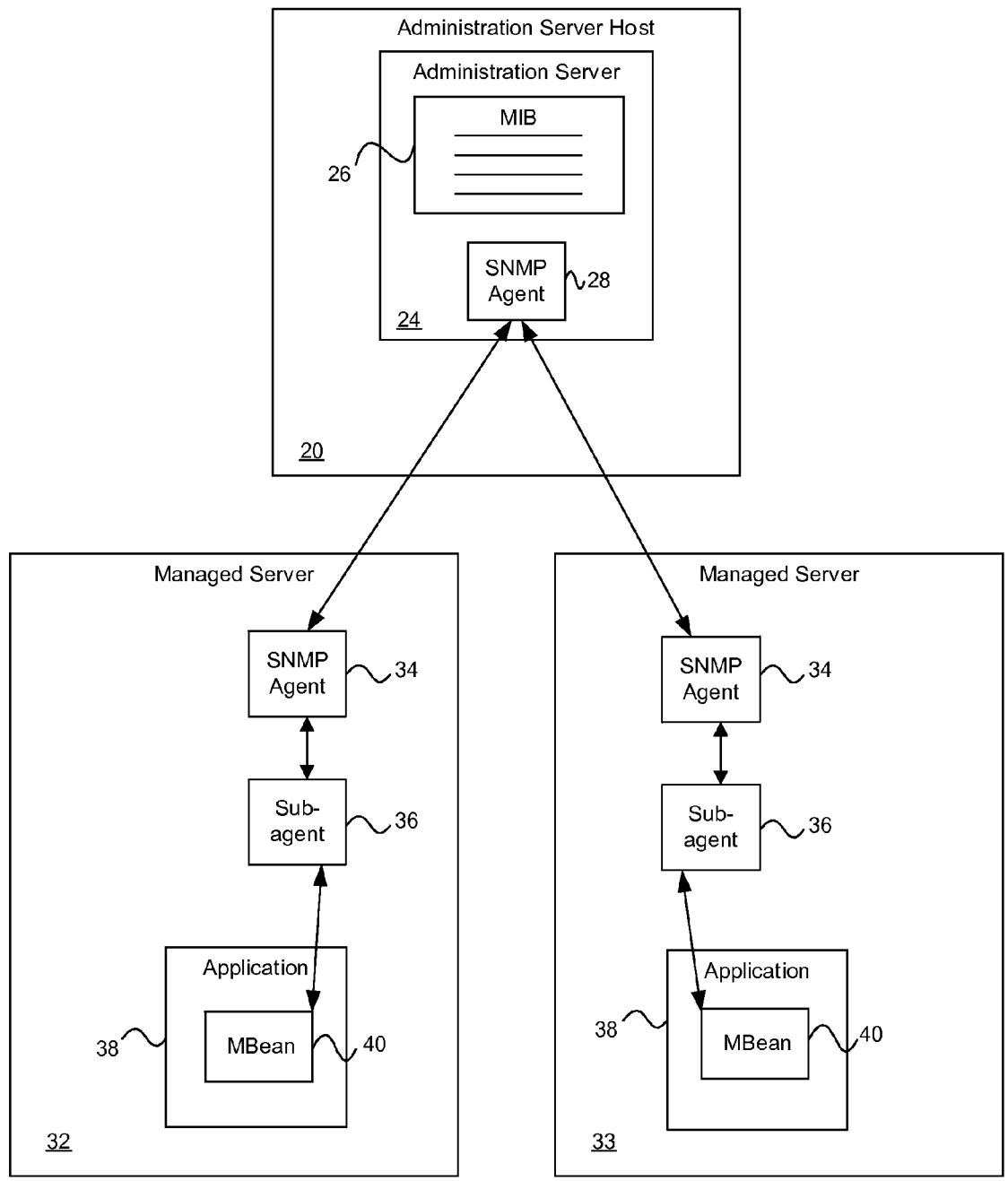
FIG. 1 shows a graphical representation of a system, comprising an administration server host, management information base, and a plurality of managed servers, in accordance with an embodiment.

FIG. 1 shows a graphical representation of a system, comprising an administration server host, management information base, and a plurality of managed servers, in accordance with an embodiment. As shown in FIG. 1, each managed server instance 32 and 33 hosts one or a plurality of applications 38 including MBean 40, a SNMP Agent 34, and one or more sub-agent 36. An administration server 24 running on host machine 20 includes SNMP Agent 28 that can provide a domain wide view over each of the MBean server via SNMP. In accordance with an embodiment, the JMX MBeans expose management functions of their applications. When SNMP Agent 34 collects information from a managed server, the name and attribute of the MBean from which data is collected is specified. The administration server can then provide the central point of control for configuring and monitoring the entire domain. A SNMP manager exchanges monitoring and control information about systems and network resources through the SNMP Agent 28. The SNMP Agent then queries the managed server's SNMP Agent for the requested information, and uses it to populate the MIB 26.

In accordance with an embodiment, the MIB can be a database, data structure, or other set of data or information, that is used to manage devices (such as routers and switches) in a communications network. Any system or network resource that is manageable through the exchange of information can be considered a managed resource. Manageable attributes of the resources are referred to herein as objects, and are accessed using a network-management protocol such as the SNMP protocol. The SNMP protocol facilitates the exchange of information between a network-manager and a managed resource.

Figure 2:
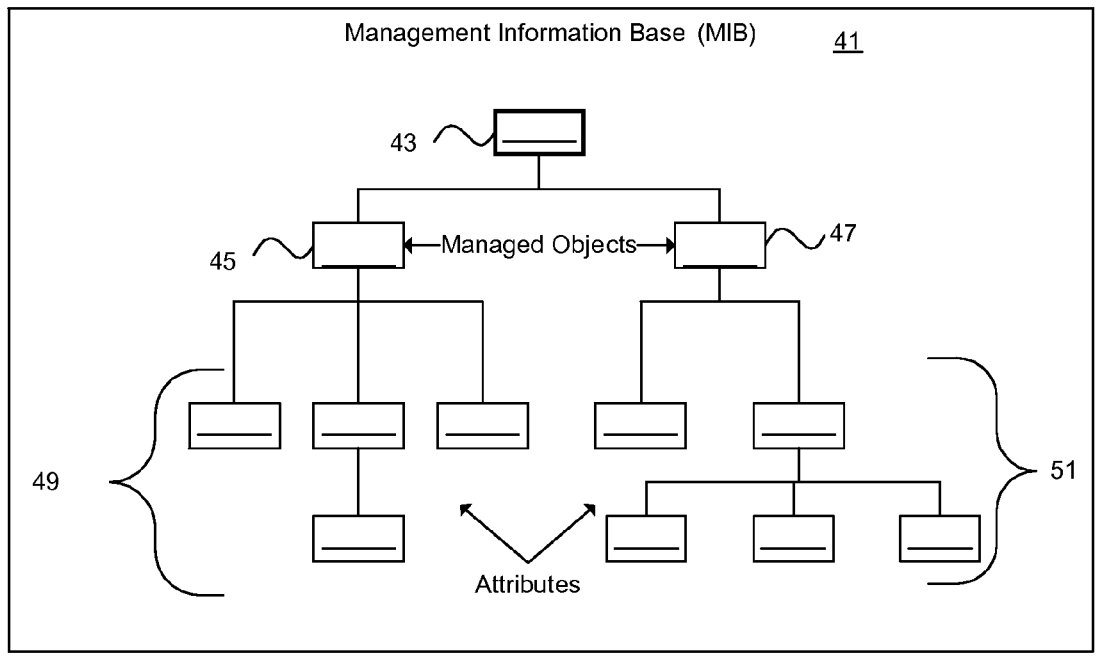
FIG. 2 shows a graphical representation of a management information base in accordance with an embodiment.

FIG. 2 illustrates a MIB in accordance with an embodiment. As shown in FIG. 2, MIB 41 is comprised of a database or data structure 43, which in turn includes a hierarchical list of managed objects in the domain. Objects 45 and 47 represent managed resources (for example a router, or a switch) which can be monitored by the network-manager. Selected attributes 49 and 51 of a managed device are used by the network-manager to manage the network-device, and can be shared with other servers in the domain.

In accordance with an embodiment, SNMP management is based on an agent/manager model. Network and System Administrators use the network-managers together with the SNMP protocol to monitor network-attached devices for conditions that warrant administrative attention. A network-manager exchanges monitoring and control information about system and managed resources with distributed software processes that are referred to as agents. The agents (also referred to as SNMP Agents) in turn respond to network-manager requests for information. A computer running a SNMP Agent software can be considered a SNMP Agent, wherein the running SNMP service or agent software responds to information requests from one or multiple network-management systems. In accordance with an embodiment the SNMP service can also be configured to determine which statistics are tracked, and which management systems are authorized to request information.

In accordance with an embodiment, a SNMP Agent is a network-management software module that resides in a managed device or managed resource. The agents function as "collection devices" which gather and send data via SNMP about the managed device or resource, in response to a request from a network-manager.

In accordance with an embodiment, each SNMP Agent on the managed servers can act as a master agent to which one or more sub-agents can register. The network-manager views the sub-agent and the agent as one entity. The sub-agent provides an extensibility mechanism to dynamically generate MIB entries for custom or user MBeans. This allows for the monitoring and management of deployed MBeans through SNMP, by allowing other resources to expose their MIB as a sub-agent to the network-manager.

Figure 3:
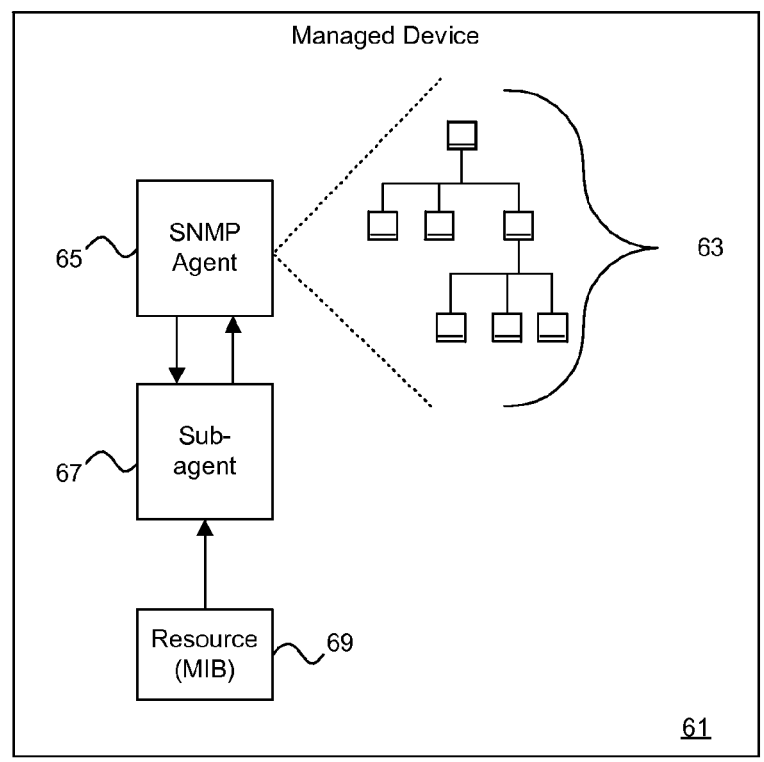
FIG. 3 shows a graphical representation of a managed device, including agent/sub-agent architecture in accordance with an embodiment.

FIG. 3 illustrates a SNMP Agent and a managed device in accordance with an embodiment. As shown in FIG. 3, a managed device 61 hosts a SNMP Agent 65 and sub-agent 67. The agent/subagent pair will be viewed as a single entity by the network-manager. Platform devices can instantiate their own SNMP Agent independent of the application server and register it as a sub-agent, and the attributes of those devices are then available within the attributes exposed by SNMP Agent 65 and sub-agent 67 to the network-manager. As also shown in FIG. 3, resource 69 represents a platform device. In accordance with an embodiment, resources expose their MIB to sub-agent 67. SNMP Agent 65 then has local knowledge of manageable attributes 63 pertaining to managed device 61, and translates that information into a form compatible with SNMP.

Figure 4:
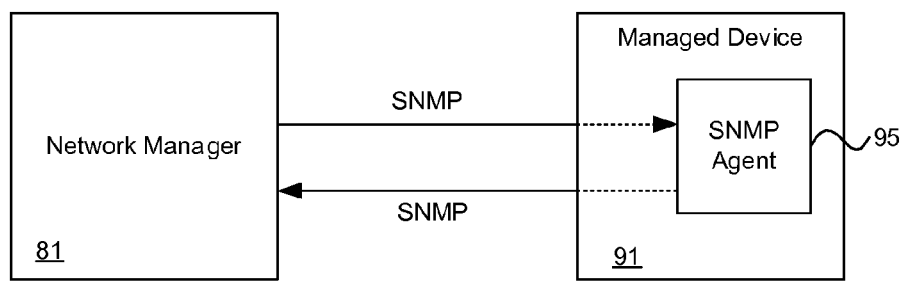
FIG. 4 shows a graphical representation of communication between a managed device and a network-manager.

FIG. 4 shows a graphical representation of the communication between a managed device and a network-manager in accordance with an embodiment. As shown in FIG. 4, SNMP Agent 95 exposes management data on managed device 91 and resource as variables to network manager 81 using the SNMP protocol. The network-manager relies upon a database of definitions and information about the properties of managed resources and the services the agents support. This comprises the MIB. In accordance with an embodiment, when new agents are added to extend the management reach of a manager, the manager is provided with a new MIB component that defines the manageable features of the resources managed through that agent. The manageable attributes of resources, as defined in a SNMP-compliant MIB, are referred to as managed objects. Defining the heterogeneous components of an enterprise's distributed systems within a common MIB on the management station provides a unified perspective and single access point for managing system and network resources.

In accordance with an embodiment, several technologies are available that supply tools for managing and monitoring applications, system objects, devices (e.g. printers) and service oriented networks. For example, JMX is a Java-based technology that supplies tools for managing resources, in which the resources are represented by objects called MBeans. The JMX application server is supported by a variety of software vendors. Resources on the server can use JMX MBeans to expose their management functions. In accordance with an embodiment, a MBean is a Java class that is developed per JMX specifications, and can provide getter and setter operations for each management attributes within a managed resource, collect statistics (e.g., performance and resource usage) along with additional management operations that the resource makes available. As described above, resources on an application server can use SNMP and the agent/manager model to monitor those resources. In accordance with an embodiment, the system allows attributes exposed through the JMX layer ton also be exposed through SNMP to a network-manager within the same domain.

Figure 5:
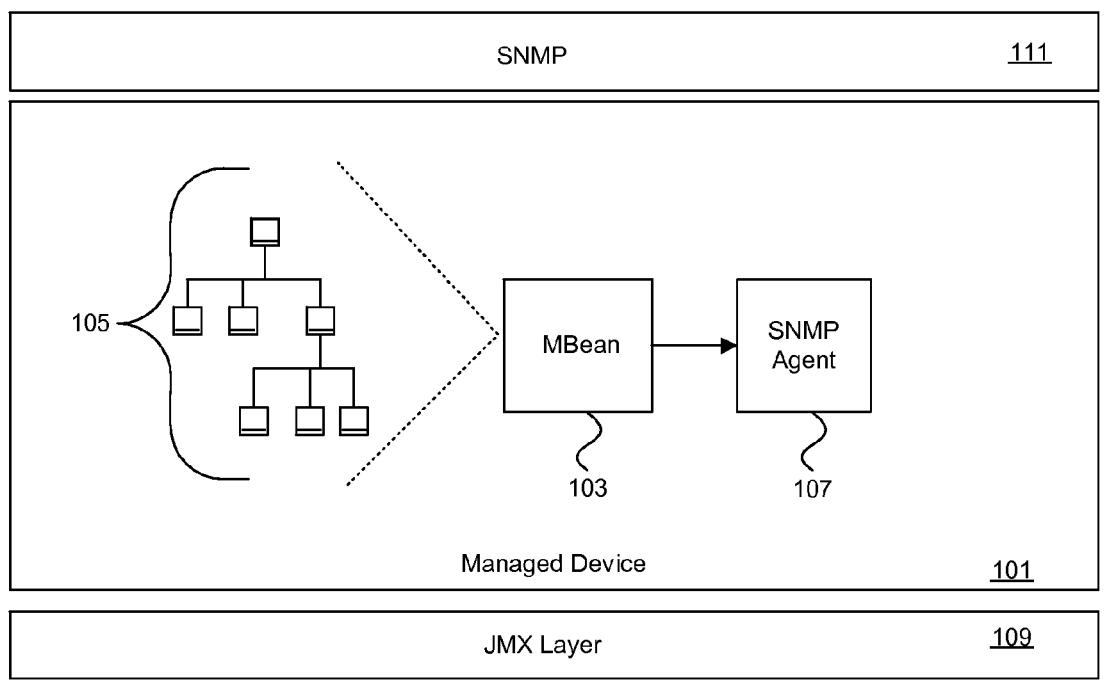
FIG. 5 shows a SNMP Agent exposing manageable attributes of a managed device through SNMP in accordance with an embodiment.

FIG. 5 illustrates a managed resource comprising a MBean and SNMP Agent in accordance with an embodiment. As shown in FIG. 5, application 101 is a managed resource that collects and stores application attributes 105. JMX layer 109 supplies the tools for managing and monitoring, amongst other things, applications. A MBean represents applications running on the JMX layer. MBean 103 is used both to get and set the configuration of application 101, and also collects statistics (for example, performance and resource usage) pertaining to application 101. SNMP Agent 107 inspects MBean 103, and exposes that information through SNMP 111.

In accordance with an embodiment, an inter-related set of application resources that are managed as single unit is referred to as a domain. A domain includes one or more servers. Within each domain, one server is an administration server, while other servers in the domain are referred to as managed servers. The administration server provides the central point of control for configuring and monitoring the entire domain and also has the ability to run the SNMP service. When the SNMP service is enabled for a domain, the administration server is functioning as the SNMP Agent for that domain.

Figure 6:
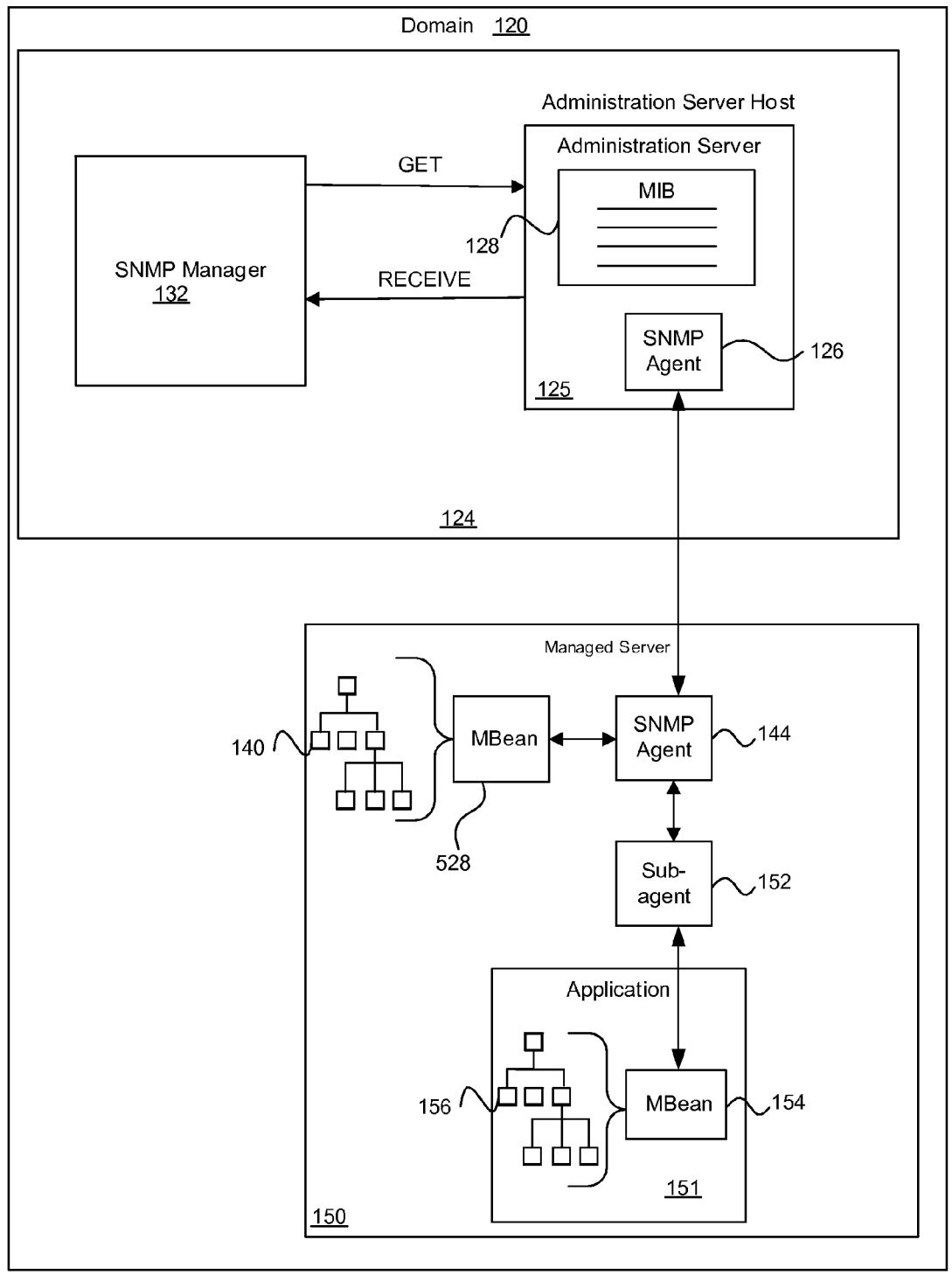
FIG. 6 shows a diagram of a system in accordance with an embodiment, and shows the components used to dynamically extend SNMP MIB to expose a MBean with SNMP.

FIG. 6 shows an illustration of a system for dynamically extending SNMP MIB to expose customer MBeans using SNMP in accordance with an embodiment. As shown in FIG. 6, domain 120 is an inter-related set of server resources that are managed as a unit. Domain 120 includes one or more servers. Within the domain is administration server 124, one or more managed server 150, and SNMP manager 132. In accordance with an embodiment, each managed server instance in the domain hosts a SNMP Agent. For example, FIG. 6 shows managed server 150 hosting SNMP Agent 144. In accordance with an embodiment, there can also be multiple managed servers in a domain, each hosting a SNMP Agent. The administration server's SNMP Agent 126 provides a domain wide view over the MBean server via SNMP. In accordance with an embodiment, managed server 150 uses JMX MBean 154 to expose management function 156 of application 151. When SNMP Agent 144 collects information from managed server 150, the name and attribute of the MBean from which data is collected is specified. Administration server 125 can then provide the central point of control for configuring and monitoring the entire domain 120. SNMP manager 132 exchanges monitoring and control information about systems and network resources through SNMP Agent 126. When configuring and monitoring a managed server 150, SNMP manager 132 communicates to SNMP Agent 126, which then queries the managed server's 150 SNMP Agent 144 for the requested information. In accordance with some embodiments, if SNMP manager 132 has been granted write access to the SNMP Agent 144, then SNMP manager 132 can also initiate a change to that SNMP Agent's configurations.

In accordance with an embodiment, the SNMP manager relies upon a database of definitions and information about properties of managed servers. For example, in accordance with an embodiment, a managed server's MBean 528 exposes managed server's attributes to SNMP Agent 144, which then communicates these attributes to the SNMP Agent located on the administration server. This information is used to populate MIB 128. When new SNMP Agents are added to extend the management reach of manager 132, then SNMP manager 132 must be provided with a new MIB component that defines the manageable features of the additional resources that are managed through that agent.

In accordance with an embodiment, application 151 exposes manageable resources 156 to MBean 154, and sub-agent 152 determines the attributes of MBean 154. The SNMP Agent on the managed resource can be considered as publishing data and/or monitoring data, and can be segmented as an agent and one or more sub-agents, in which the sub-agent attaches to the SNMP Agent and, as described above, are viewed as a single entity by the network-manager. The sub-agent monitors data and that data becomes available to an external SNMP manager. SNMP Agent 144 on the managed server then exposes that information to SNMP Agent 126 on the administration server. The administration server's SNMP Agent 126 then extends MIB 128 to add that information. In this manner MIB 128, which would otherwise be static, is extended at run time. This also allows any SNMP manager which is communicating with a SNMP Agent running on the domain to be aware of non-application server specific MBeans, and customer MBeans.

Figure 7:
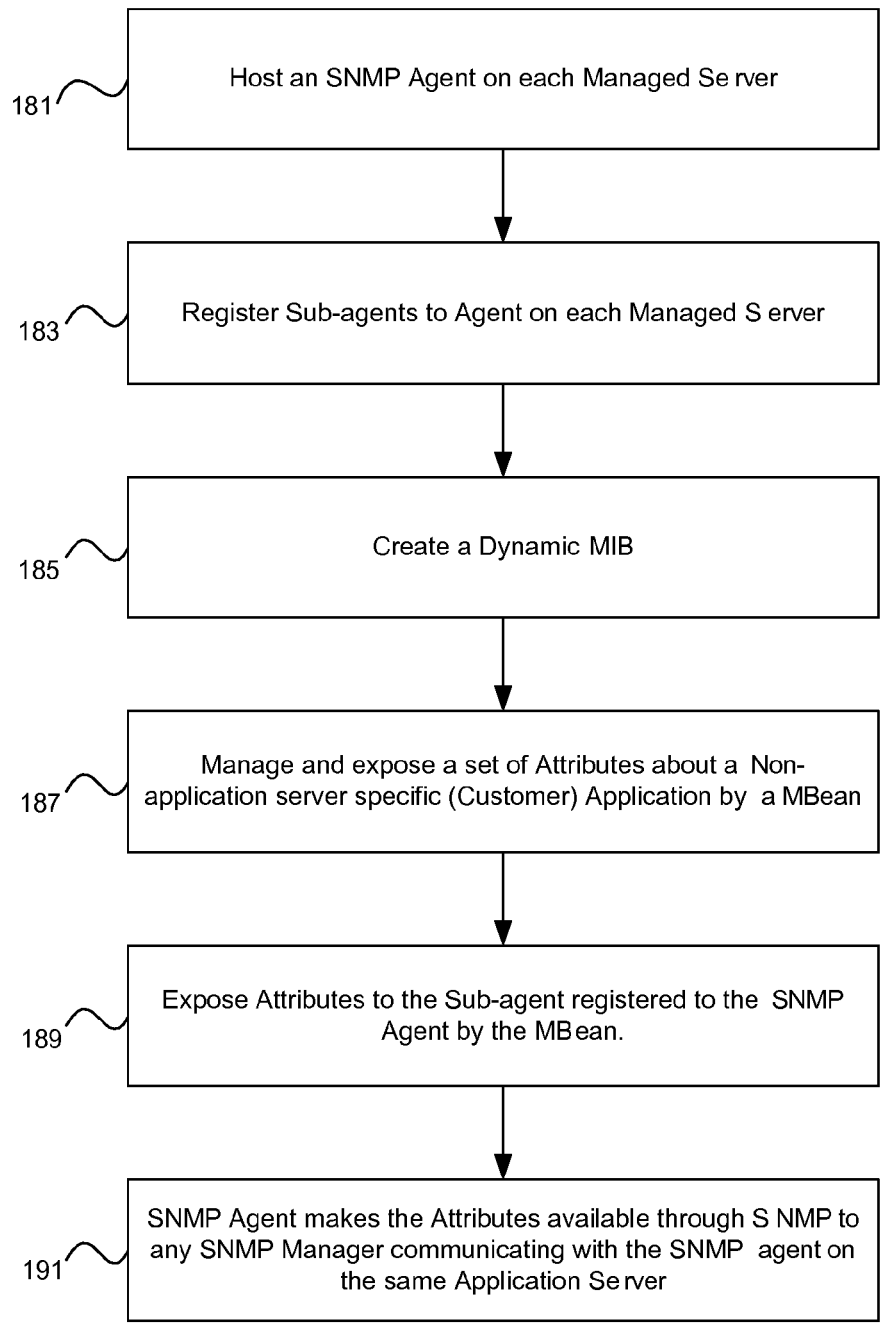
FIG. 7 shows a flow diagram in accordance with an embodiment, and illustrates a method to dynamically extend SNMP MIB to expose customer MBean with SNMP.

FIG. 7 shows a flowchart for a process to dynamically extend SNMP MIB to expose non-application server specific MBeans with SNMP in accordance with an embodiment. As shown in FIG. 7, in step 181, each managed server instance in the application server domain hosts a SNMP Agent. This agent provides a view of the JMX Runtime MBeanServer over SNMP. In addition, each managed server has its own SNMP Agent that will be a master agent for other non application server SNMP Agents. A sub-agent provides a means to dynamically generate MIB entries for user MBeans. In step 183 a SNMP Agent on the managed server acts as a master agent to which sub-agents can register. In accordance with an embodiment, the master-subagent architecture mandates unique object identifiers (OIDs) for each subagent. This allows non-application specific applications to expose their attributes as a sub-agent to the application server master agent. In step 185 a dynamic MIB is created that hosts all non-application server specific MBeans registered in the Runtime MBean Server. In accordance with an embodiment, the system uses a SNMP table defined in the MIB for each non-application server specific MBean type, in which all instances of this type appear as a row in the SNMP table. This MIB is defined at runtime and a sub-agent registered with the managed server's SNMP Agent acts as a master agent. In step 187 a customer MBean is used to manage and expose a set of attributes about a non-application server specific application. In step 189 the customer MBean exposes those attributes to the sub-agent registered to the SNMP Agent on the administration server. In step 191 the SNMP Agent makes these attributes available through SNMP to any SNMP manager which is communicating with the SNMP Agent on the same application server.

Sharing of Security Information

In accordance with another embodiment, a system is described in which SNMP provides increased security and support for both Transmission Control Protocol/Internet Protocol (TCP/IP) and Universal Datagram Protocol (UDP) protocols by defining security aspects such as authentication and privacy. This allows user authentication, privacy and authorization based on application server security configuration as opposed to the limited community string based security provided in previous releases of SNMP.

In accordance with another embodiment, the security aspects of SNMP are centralized. In configuring the security aspects, each managed server on the application server can host its own SNMP Agent. The SNMP manager, which is monitoring all SNMP Agents, can communicate directly to the individual SNMP Agents on each managed server to get monitoring data. Embodiments of the present invention centralize this configuration. Credential information is configured across the domain in one location, which allows all SNMP Agents on the application server domain to share information.

Figure 8:
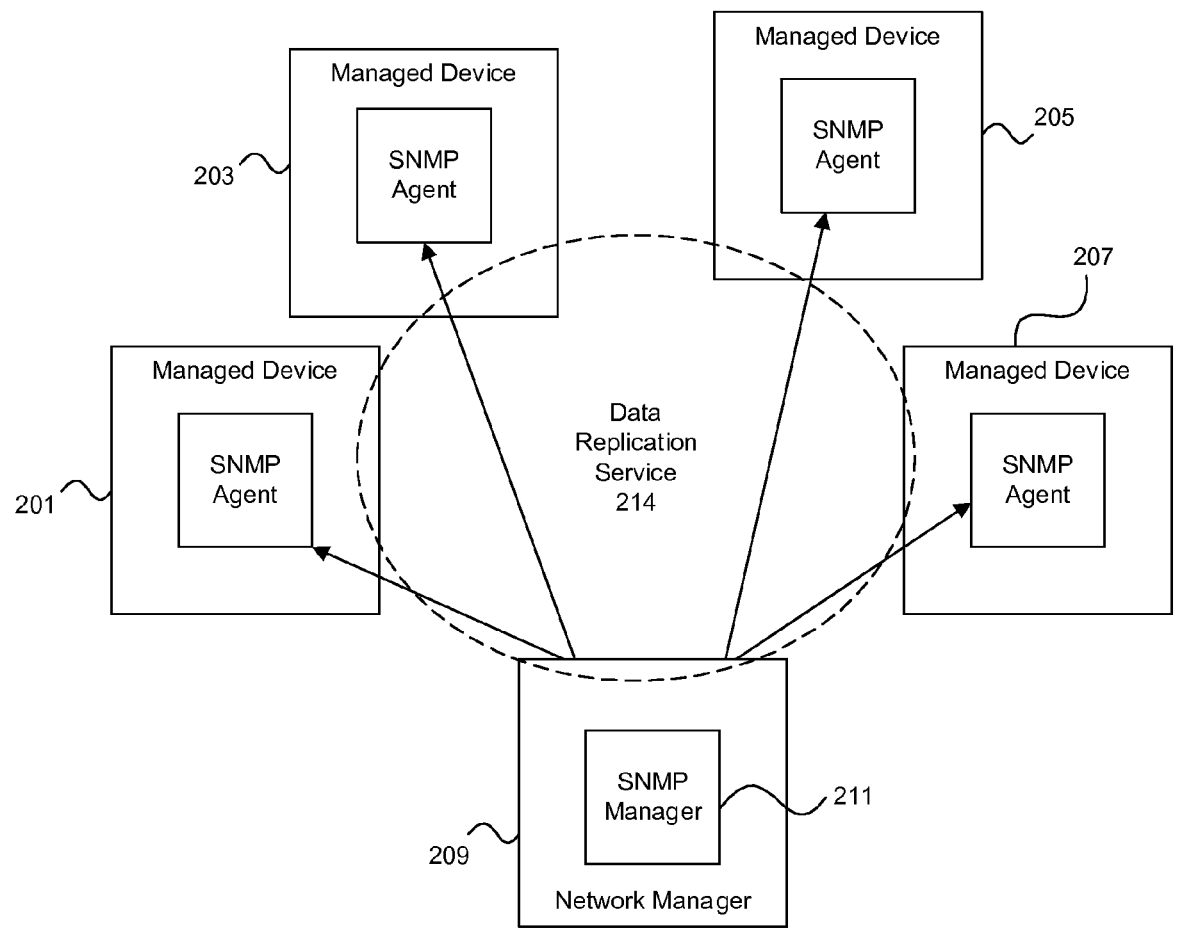
FIG. 8 shows a diagram to share security information across multiple SNMP Agents running within a domain for authentication and privacy in accordance with an embodiment.

FIG. 8 shows an illustration of a system to share security information across multiple SNMP Agents running within a domain for authentication and privacy in accordance with an embodiment. As shown in FIG. 8, each of a plurality of managed devices 201-207 can host a SNMP Agent. Each SNMP Agent on managed devices 201-207 communicates with SNMP manager 211 on network-manager 209. Credential information can be configured on SNMP manager 211 and communicated using a data replication service 214 to each SNMP Agent in the domain. In this respect, credential information is configured across the domain in one location. Since all SNMP Agents on managed devices communicate with the SNMP manager, all SNMP Agents on the application server domain can share credential information.

Figure 9:
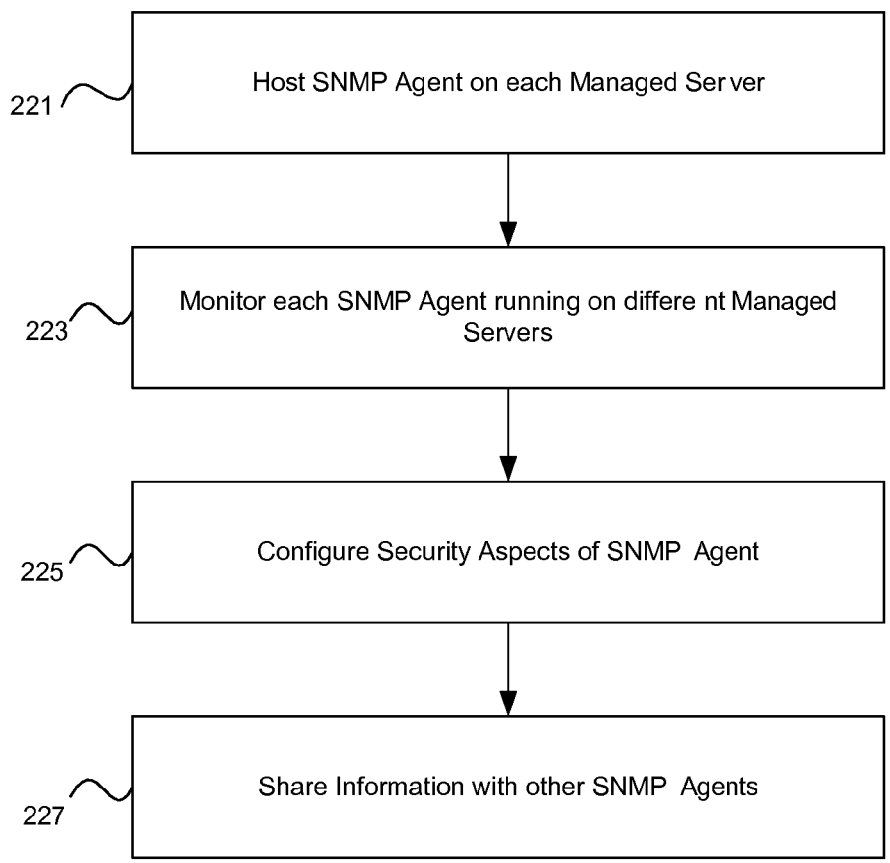
FIG. 9 shows a flow diagram in accordance with an embodiment, and illustrates a method to share security information across multiple SNMP Agents running within a domain.

FIG. 9 shows a flowchart for a process to share security information across multiple SNMP Agents running within a domain in accordance with an embodiment. As shown in FIG. 9, in step 221 each managed server instance in the application server domain hosts a SNMP Agent. This agent provides a view of the JMX Runtime MBeanServer over SNMP. In step 223 the SNMP manager monitors each SNMP Agent running on the different managed servers, and can directly communicate with each individual SNMP Agent to obtain monitoring data. In step 225 the SNMP manager configures security aspects of SNMP. This allows the configuration of SNMP security aspects to be centralized at the SNMP manager. Since all SNMP Agents communicate with the SNMP manager, using, for example, a data replication service, each agent can communicate with one another through the SNMP manager. In step 227, agents in the domain share security information amongst each other. Since these security configurations are made available to all agents from the SNMP manager, only the SNMP manager is configured, rather than each individual agent. This provides advantages over the cumbersome task of configuring the security aspects of each SNMP Agent individually.

Console for Custom Metric Attributes

In accordance with an embodiment, a system comprises a "dashboard" application, which is provided as an administrative tool that runs from a network management console. The dashboard allows network administrators to review monitoring data collected from the different MBeans exposed by the application server. In accordance with an embodiment this data includes metric attributes from MBeans which are exposed by the application server.

In accordance with an embodiment, metric attributes can be identified by a system or network administrator by browsing through a navigation tree that the dashboard application provides. In one embodiment, the top level of the tree identifies different types of MBeans that the application server provides. Below this top level are the different instances of the particular MBean. The dashboard also displays the available attributes that the application server monitors for that particular MBean. For example, a MBean can expose metric data or metrics about the Java Virtual Machine (JVM) environment upon which the application server is currently executing. This type of information exposed may include such metrics as heap_size, and current_heap_usage. These attributes can be dragged into the dashboard console's view panel.

In accordance with an embodiment, attributes exposed by MBeans on an application server are referred to herein as intrinsic attributes. Particular MBeans define certain attributes that a network administer may want to combine to synthesize a custom attribute. Custom attributes are not defined by a MBean in the logic server, but can be synthesized during runtime by combining different intrinsic attributes together into an expression. For example, as described above, a MBean may expose attributes such as heap_size and current_heap_usage. To create a custom attribute free_heap, the system administrator can direct the console to take the difference of the other two attributes. In addition to building custom expressions in terms of attributes that are already exposed by the network manager, custom attributes may be synthesized by nesting custom attributes with other custom attributes or attributes intrinsic to the administration server.

In accordance with another embodiment, the dashboard provides data which is used to build custom attributes. As described above, attributes are available as intrinsic attributes from a MBean type, such as heap_free and total_heap. In accordance with an embodiment, the dashboard also provides a set of intrinsic functions, such as difference, minimum, maximum, absolute value and average. Custom expressions are created by a drag and drop of the intrinsic functions and intrinsic attributes from the MBean type into the metric editor. These functions can be saved as a custom metric. Once saved the custom metric can be made available, like any other attribute on a MBean, to other managed servers on the application server, and can be used to synthesize other expressions.

Figure 10:
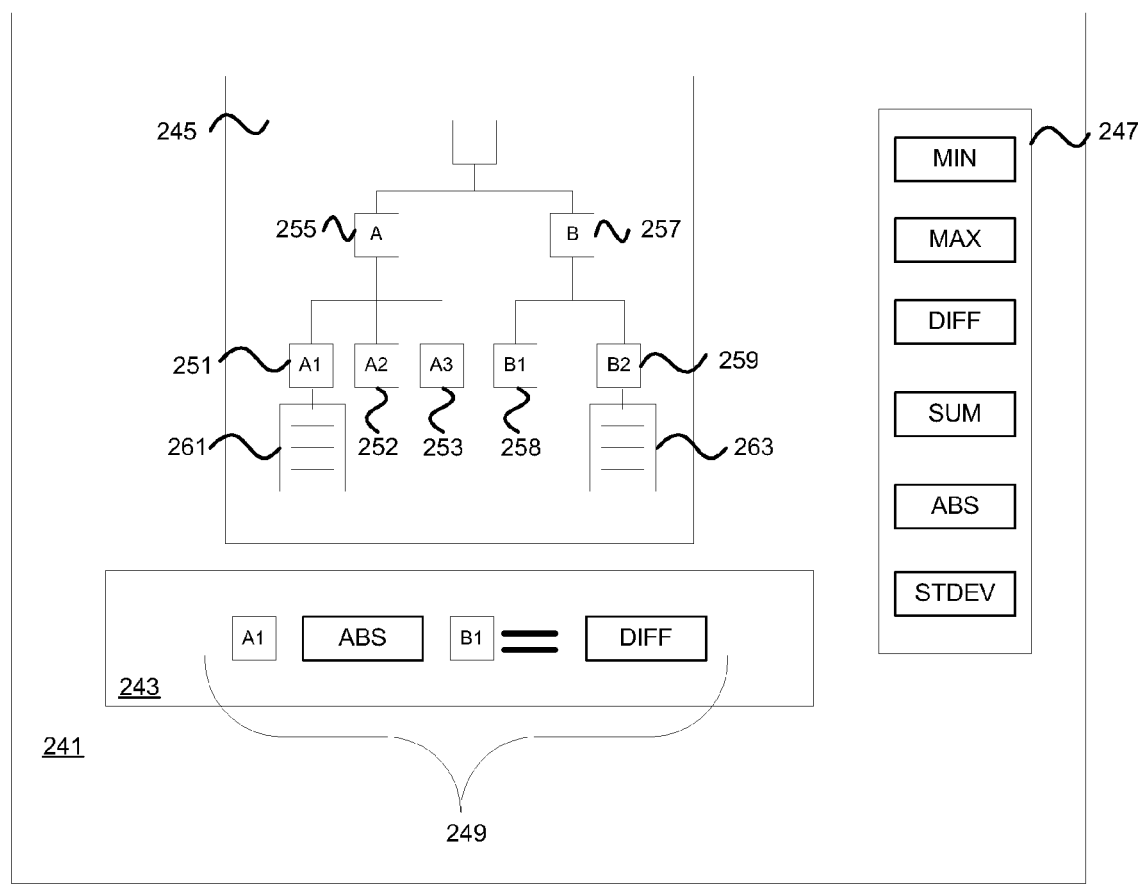
FIG. 10 shows a diagram to synthesize custom metric attributes from available MBean attributes in accordance with an embodiment.

FIG. 10 shows an illustration of a system to synthesize custom metric attributes from available MBean attributes in accordance with an embodiment. As shown in FIG. 10, the dashboard console or dashboard 241 is an administrative tool which runs from a network management console. The dashboard allows network administrators to review monitoring data collected from different MBeans exposed by the application server. This data can include metric attributes from MBeans which are exposed by the application server.

In accordance with an embodiment, the metric attributes are identified by browsing through a navigation tree 245 that dashboard provides. The top level identifies MBeans 255 and 257 that the application server provides. Below the top level are the instances 251-259 of the MBeans 255 and 257. Further below these instances are attributes 261 and 263 that the application server monitors for those particular MBeans.

Attributes exposed by MBeans on an application server are referred to as intrinsic attributes. Particular MBeans define certain attributes that a network administer may want to combine to synthesize a custom attribute. Custom attributes are not defined by a MBean in the logic server, but can be synthesized during runtime by combining different intrinsic attributes together into an expression. For example, as described above, while an instance of MBean may expose attributes heap_size and current_heap_usage, to create a custom attribute free_heap, the system administrator can direct 249 the console to take the difference 243 of these two attributes. In addition to building custom expressions in terms of attributes that are already exposed by the administration server, custom attributes can also be synthesized by nesting custom attributes with other custom attributes or attributes intrinsic to the administration server.

The dashboard provides the data which is used to build custom attributes. Attributes are available as intrinsic attributes from a MBean type, such as heap_free and total_heap. The dashboard also provides a set of intrinsic functions 247. Examples of intrinsic functions include difference, minimum, maximum, absolute value and average. Custom expressions can be created by a drag and drop of the intrinsic functions and intrinsic attributes from the MBean type into a metric editor. These functions can be saved as custom metric. Once saved, the custom metric becomes available, like any other attribute on a MBean, to other managed servers on the application server and can be used to synthesize other expressions.

Figure 11:
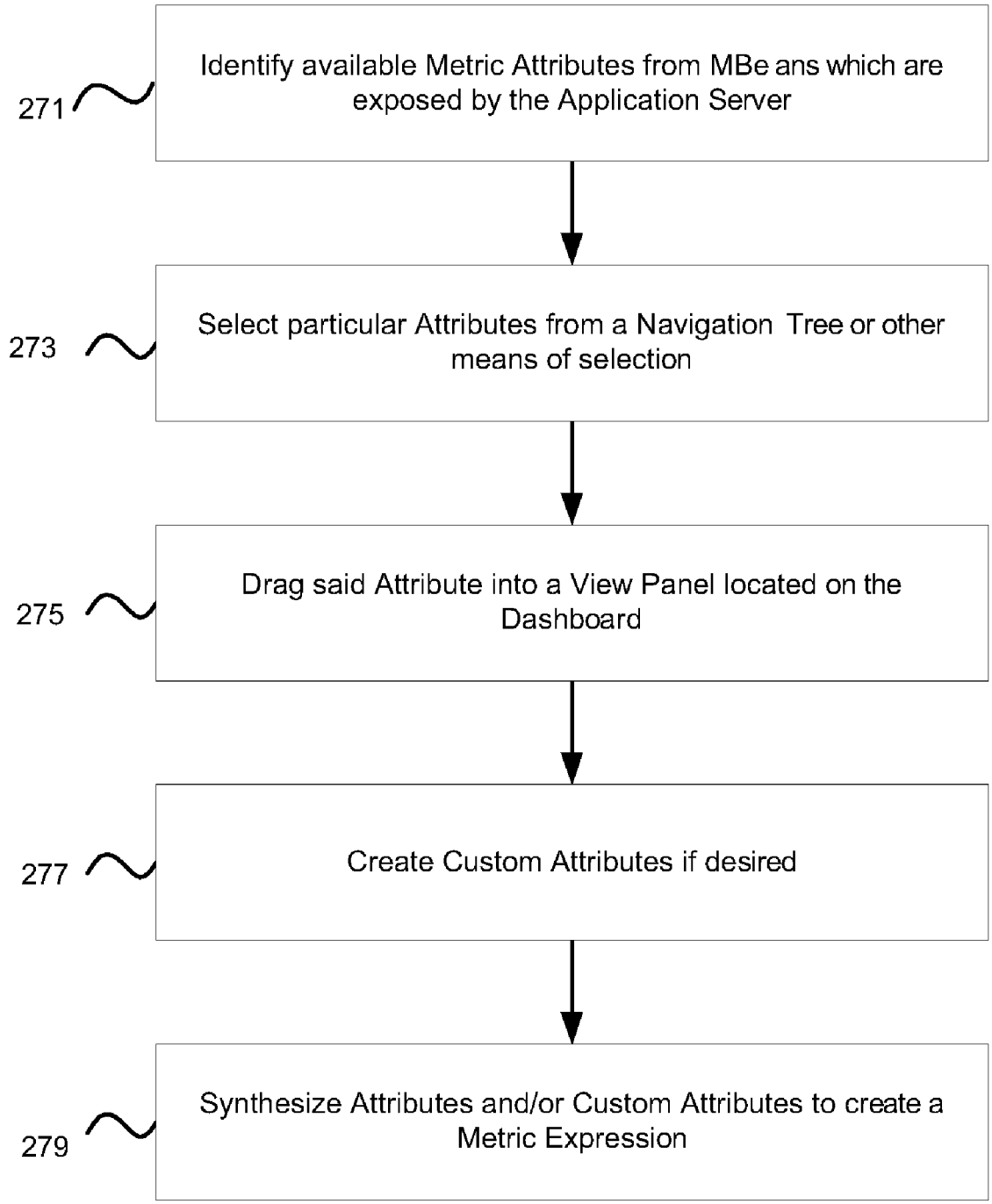
FIG. 11 shows a flow diagram in accordance with an embodiment, and illustrates a method to synthesize custom metric attributes from available MBean attributes.

FIG. 11 shows a flowchart for a process to synthesize custom metric attributes from available MBean attributes in accordance with an embodiment. As shown in FIG. 11, in step 271 the application server exposes all of the available metric attributes from the different MBeans. In step 273 a network administrator selects particular attributes from a navigation tree that the network management console provides. In step 275 the selected attributes are dragged and dropped into a view panel located on the network management console. In step 277 custom attributes are created by combining available attributes of MBeans defined by the application server or customer MBeans if they are deployed on the application server. In step 279, attributes and/or custom attributes can be synthesized to create a metric expression. Once defined, these custom attributes can be made available across all servers in the domain.

Figure 12:
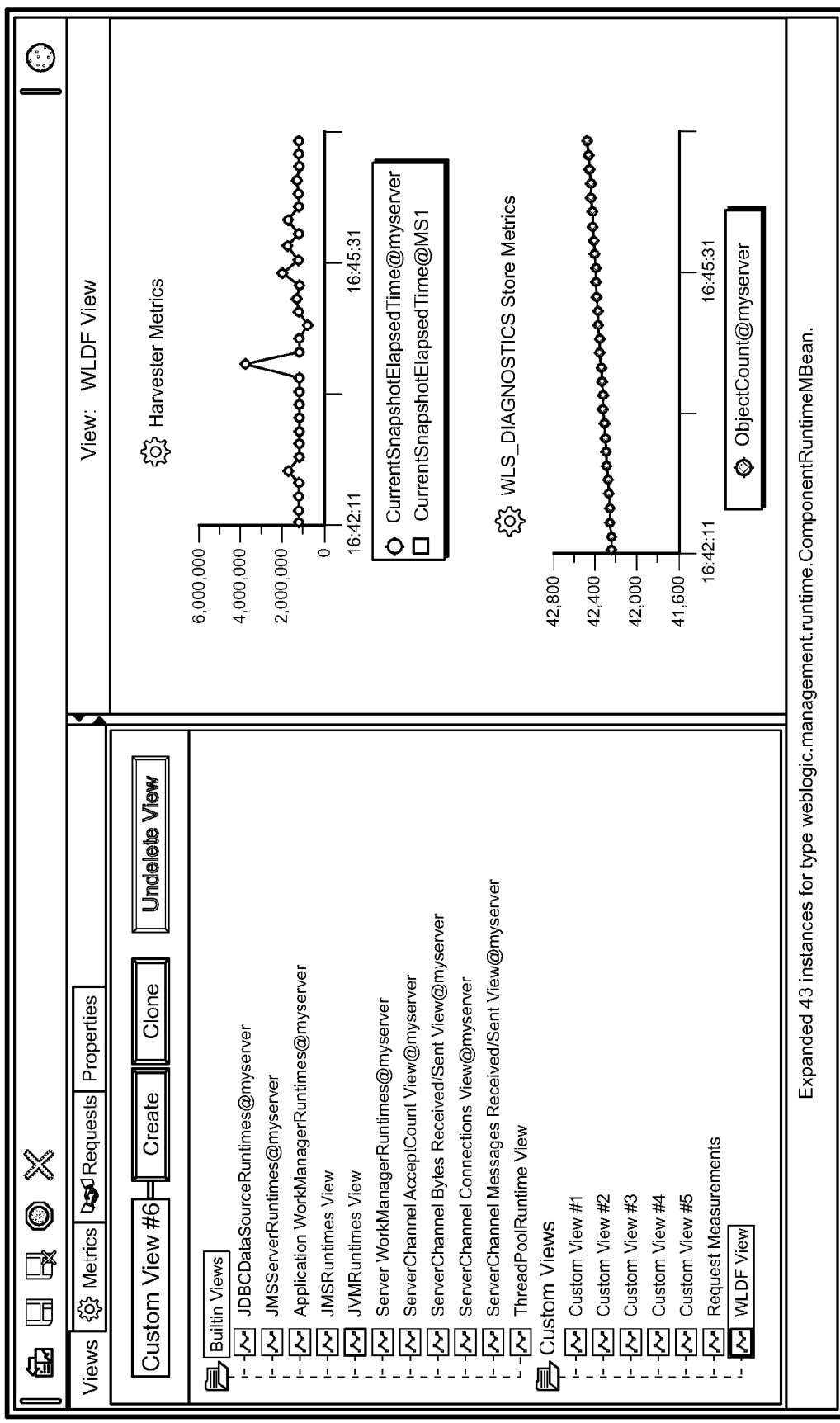
FIG. 12 shows a screenshot of a dashboard in accordance with an embodiment, illustrating a view panel.

FIG. 12 shows a screenshot 300 of a dashboard in accordance with an embodiment, illustrating a view panel. As shown in FIG. 12, metric attributes are identified by browsing through a navigation tree that the dashboard provides. A panel includes a hierarchal view of monitored information that includes folder built in view. Folder built in view provides a snap shot of available metrics that are monitored by the application server. Folder custom view displays user defined monitored metrics. A second panel includes displays a graphical view of a selected metric.

FIG. 13 shows a screenshot 304 of a dashboard in accordance with an embodiment, illustrating a view layout containing multiple charts. As shown in FIG. 13, the view layout includes a column and row separator used to control the layout of the graphical representation of metrics selected by a user. The user selects and controls the layout view of various metrics using the chart column and chart row separator.

Figure 14:
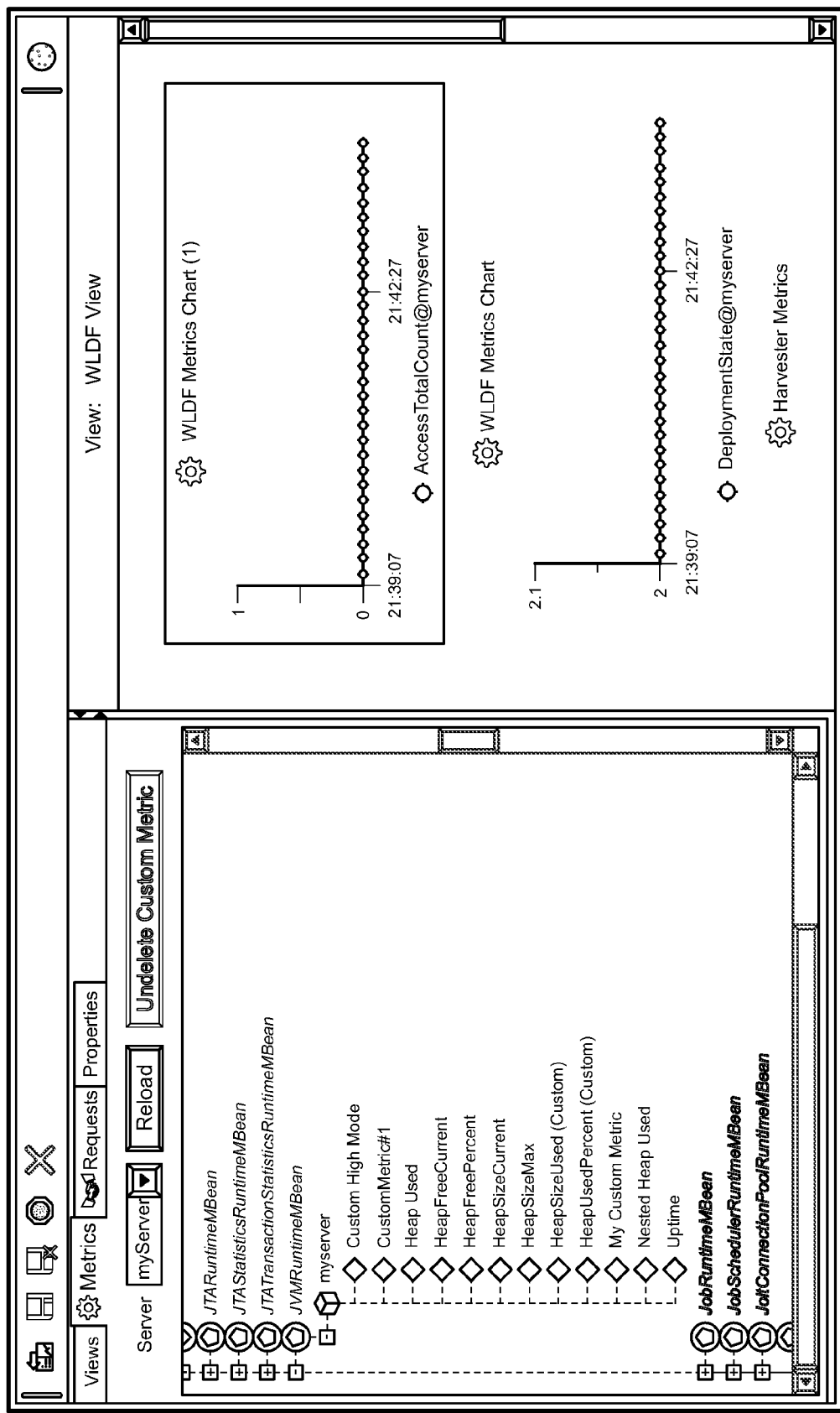
FIG. 14 shows a screenshot of a dashboard in accordance with an embodiment, illustrating a metric browser.

FIG. 14 shows a screenshot 308 of a dashboard in accordance with an embodiment, illustrating a metric browser. As shown in FIG. 14, the top level identifies different types of MBeans the application server provides. Below the top level are the different instances of the particular MBean. Displayed below the selected MBean are the available attributes that the application server monitors for that selected MBean. The dashboard further includes a panel that displays an graphical representation of the attributes of the selected MBean.

FIG. 15 shows a screenshot 312 of a custom metric editor in accordance with an embodiment, as it may be used to edit a custom metric. As shown in FIG. 15, the metric editor includes a metric name field to name the custom attribute. Intrinsic functions, such as difference, minimum, maximum, absolute value and average, are available to create and or edit a custom attributes. Custom expressions are created by drag and drop, or any other means, of the intrinsic functions and intrinsic attributes from the MBean type into the metric editor. These functions can be saved as a custom metric.

Figure 16:
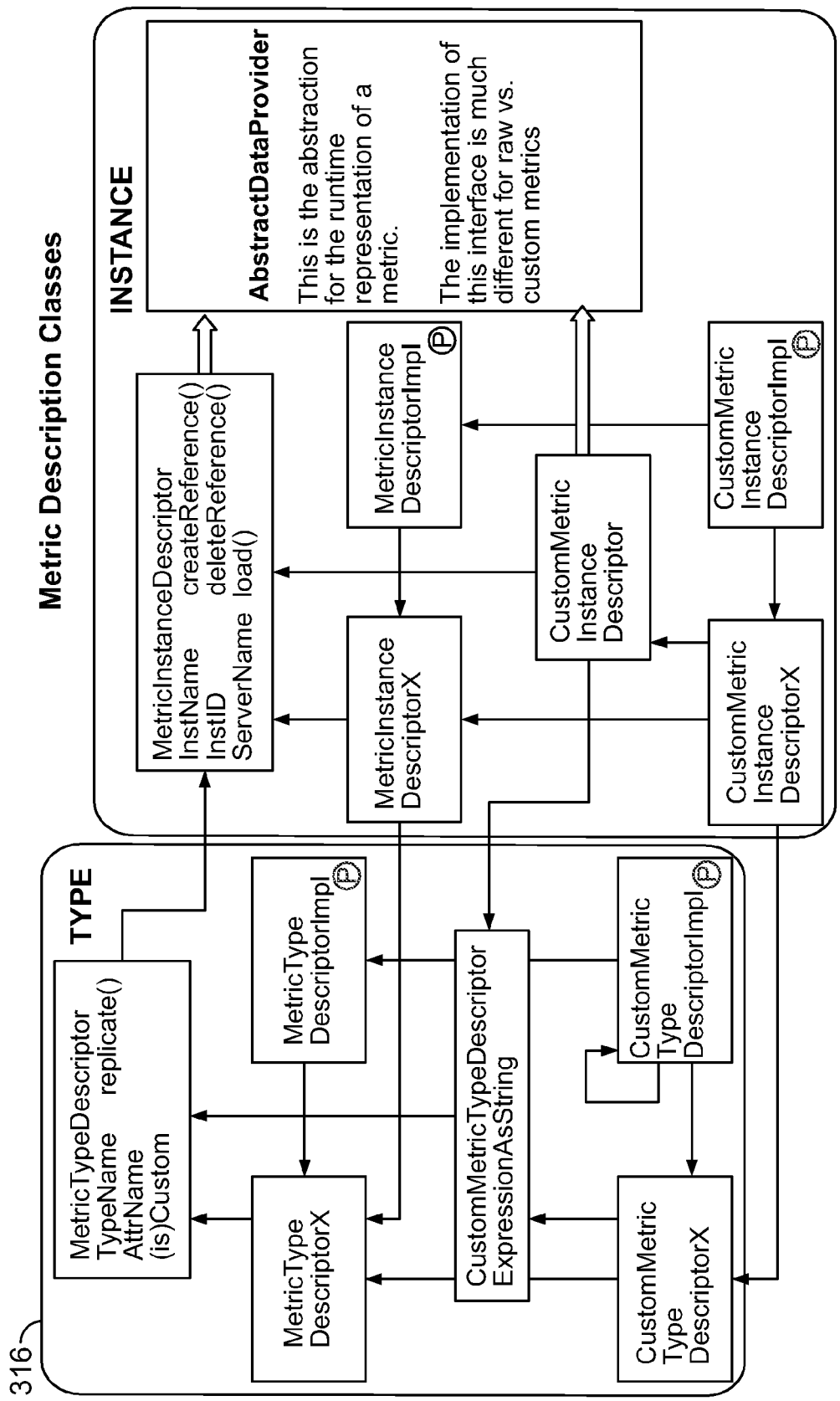
FIG. 16 shows a set of metric descriptor classes in accordance with an embodiment.

FIG. 16 shows a set of metric descriptor classes 316 in accordance with an embodiment. As shown in FIG. 16, both Type and Instance classes are displayed. Metric descriptor classes include tags TypeName, AttrName and replicate.

Figure 17:
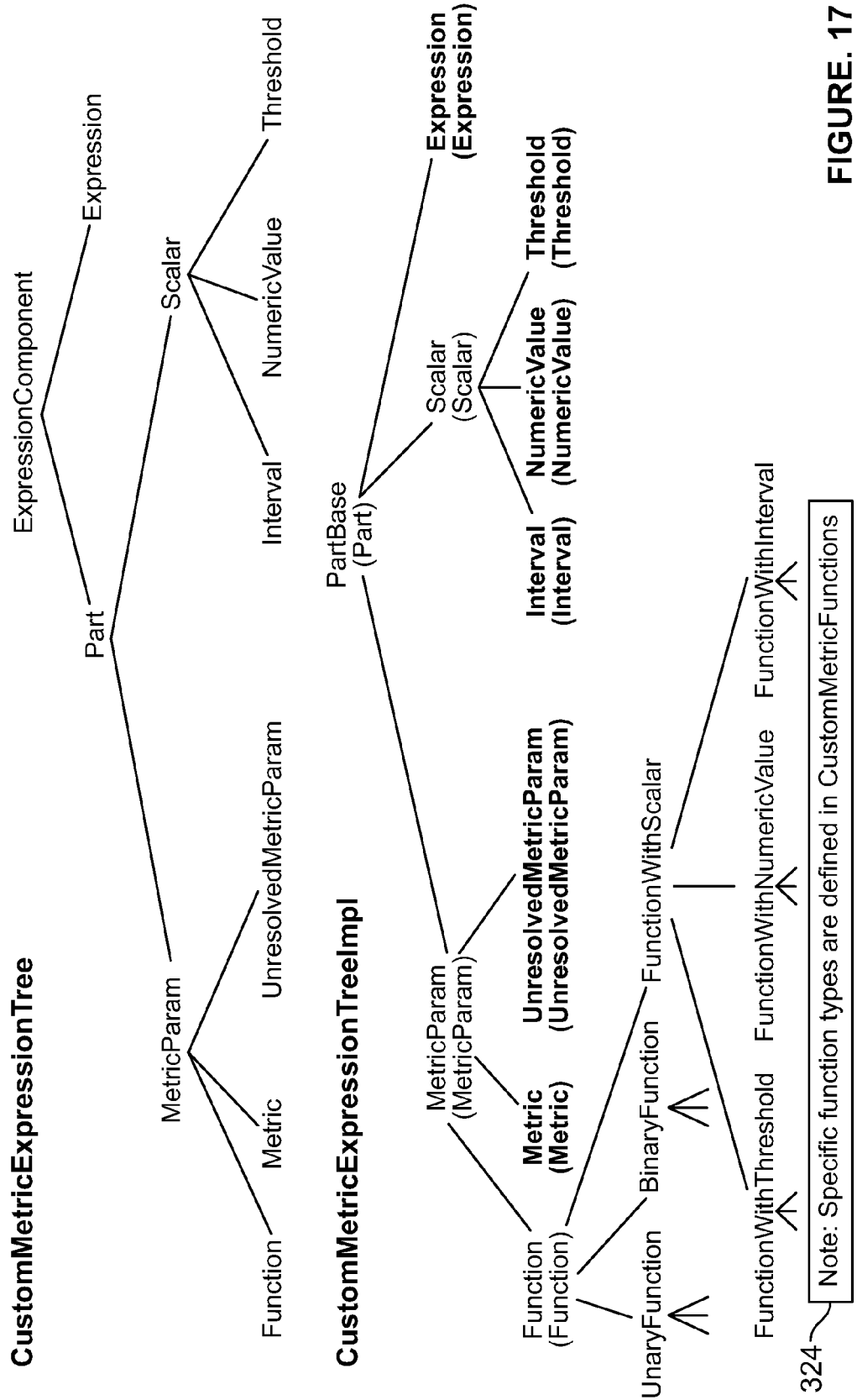
FIG. 17 shows a custom metric expression tree in accordance with an embodiment.

FIG. 17 shows a custom metric expression tree 324 in accordance with an embodiment. As shown in FIG. 17 is a custom metric expression made up of a MetricParam, a Scalar, and an Expression.

Figure 18:
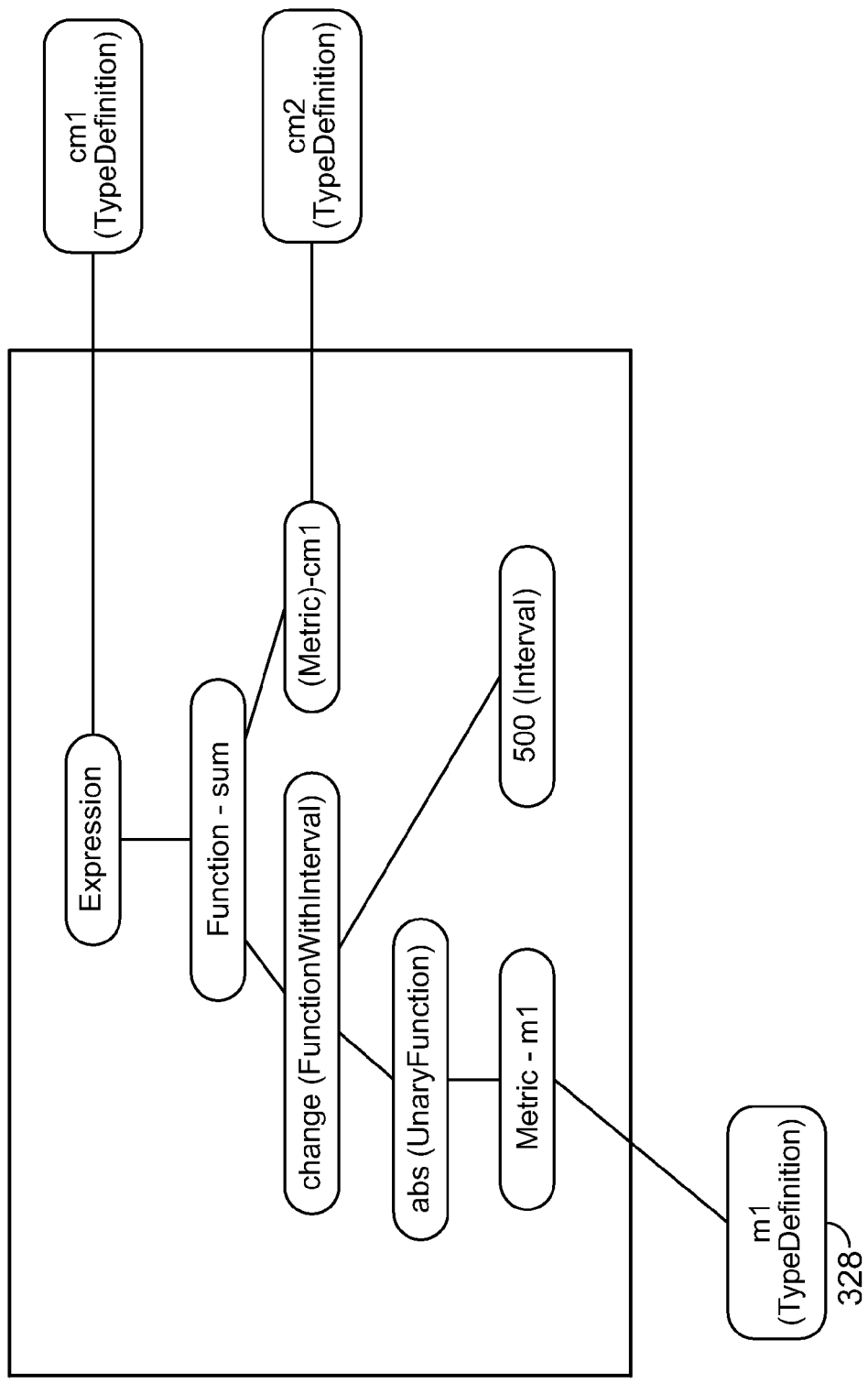
FIG. 18 shows an example of a custom metric expression definition in accordance with an embodiment.

FIG. 18 shows an example of a custom metric expression definition 328 in accordance with an embodiment. As shown in FIG. 18, top level of the tree includes a expression. The expression is made up of a function which comprises elements change and metric.

Figure 19:
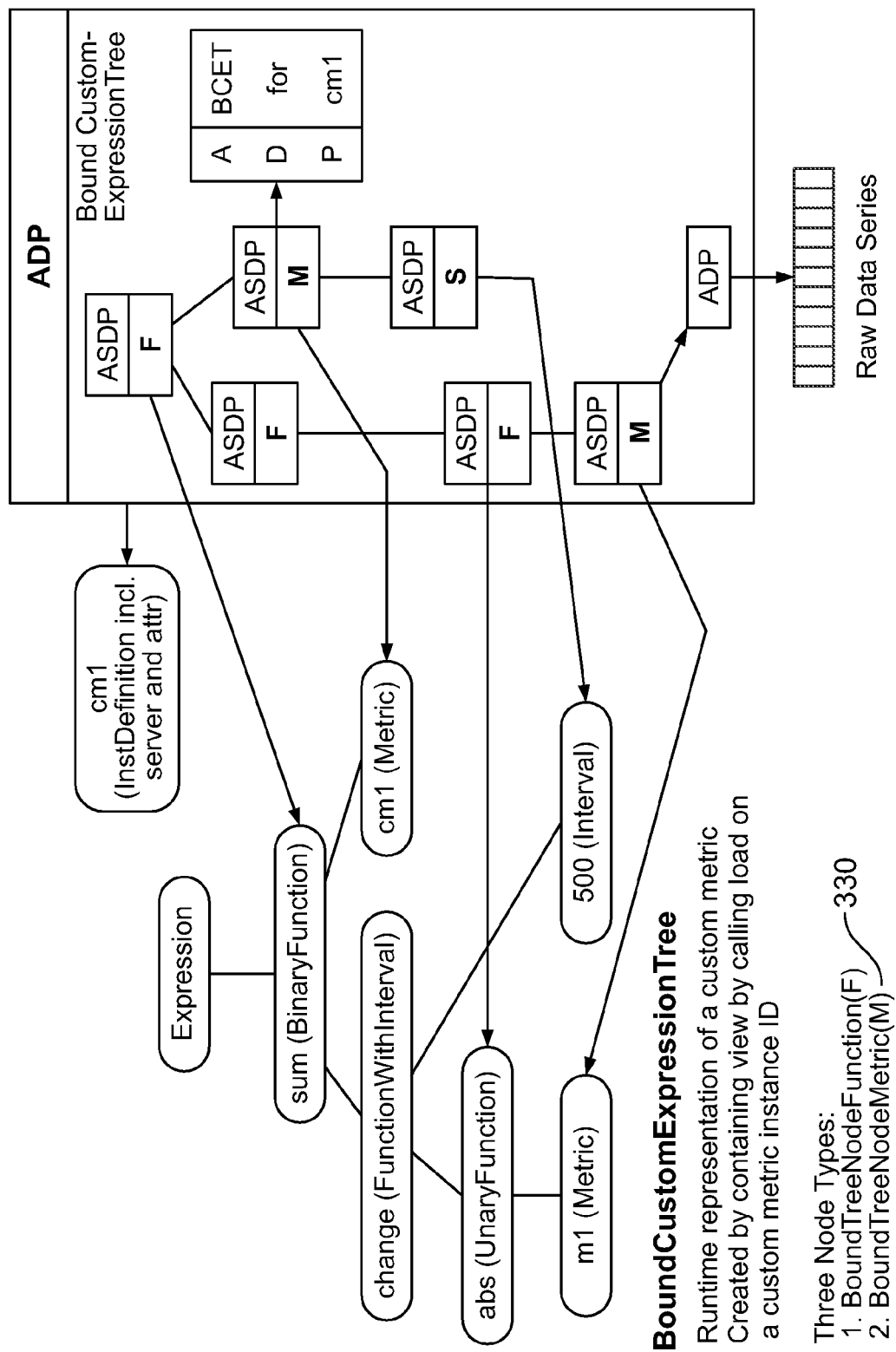
FIG. 19 shows an example of how the system parses a custom metric expression definition in accordance with an embodiment.

FIG. 19 shows an example of how the system parses a custom metric expression definition 330 in accordance with an embodiment. As shown in FIG. 19, an Expression is displayed in a tree structure. The tree structure contains metrics that make up the expression and that are used to define that particular expression.

Figure 20:
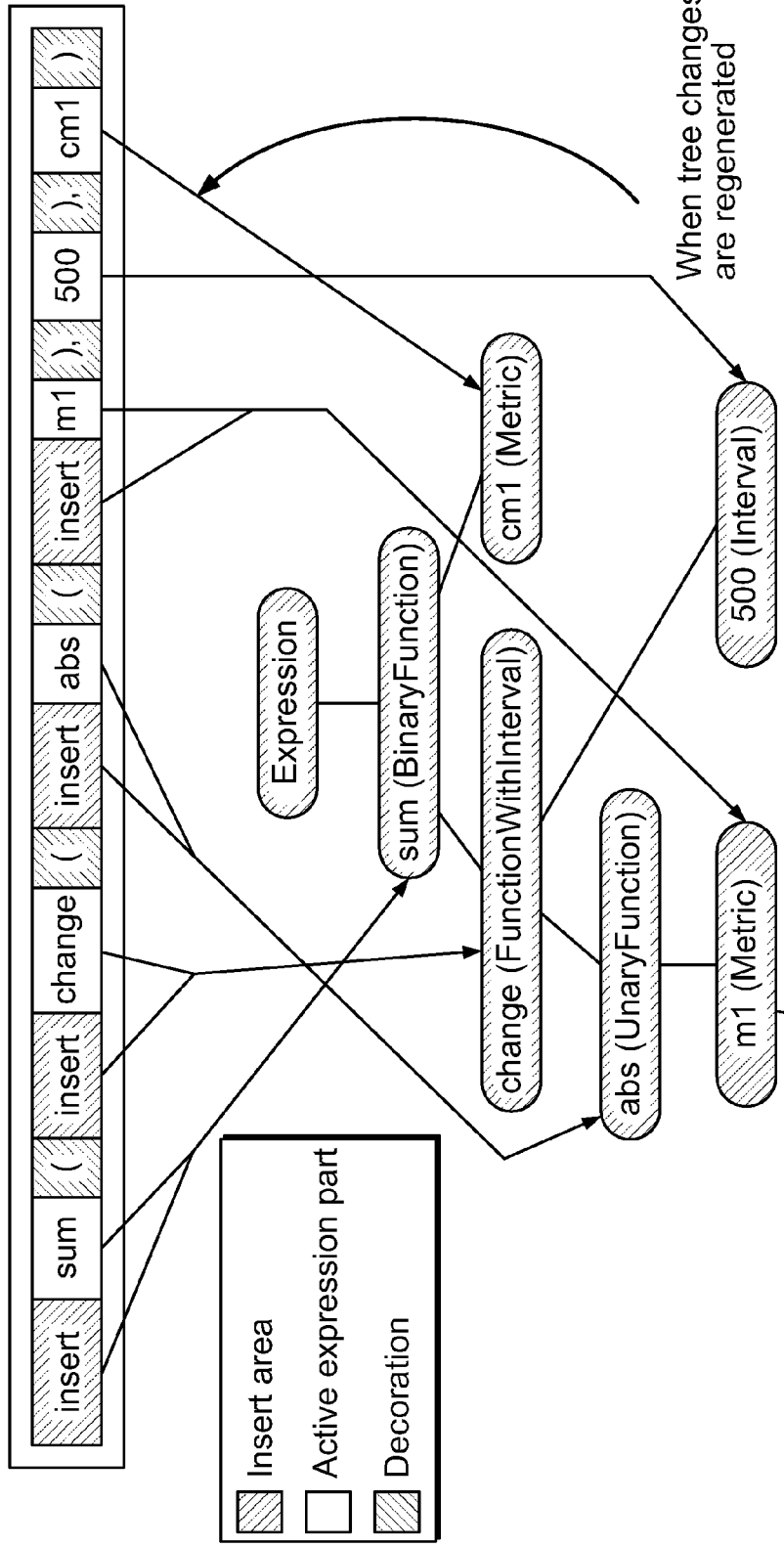
FIG. 20 shows a screenshot of an editing of an expression, in accordance with an embodiment.

FIG. 20 shows a screenshot of an editing 336 of an expression, in accordance with an embodiment. As shown in FIG. 20, an expression is represented as a box of labels. An administrator selects labels that are dropped into a tree structure. The tree structure provides a visual representation to the administrator of the expression being edited.

Figure 21:
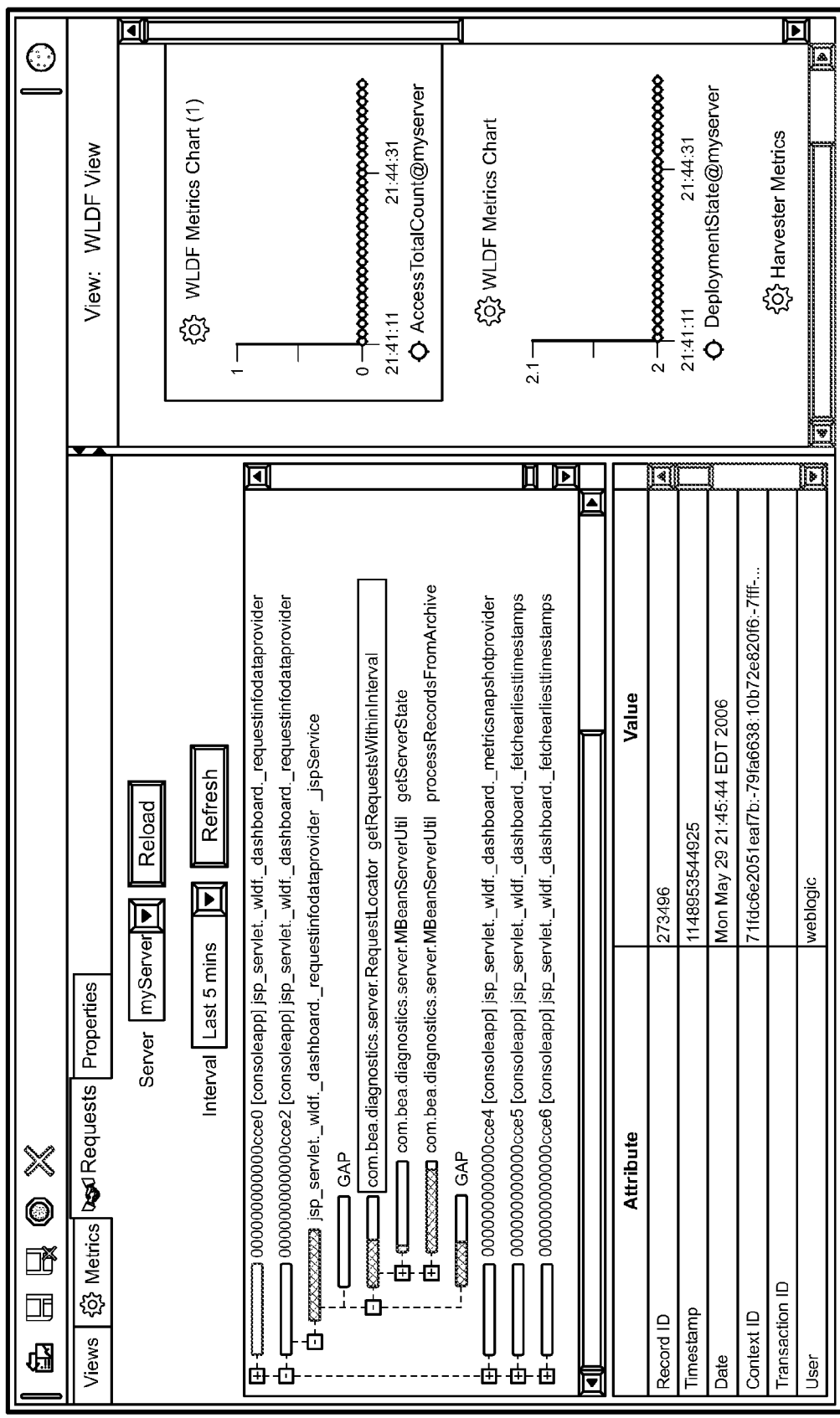
FIG. 21 shows a screenshot of a dashboard in accordance with an embodiment, illustrating the graphical output of a metric expression.

FIG. 21 shows a screenshot 342 of a dashboard in accordance with an embodiment, illustrating the graphical output of a metric expression. As shown in FIG. 21, the dashboard includes a panel that displays available metrics, properties of those metrics, and available attributes of the selected metric. In another panel, a graphical representation of the selected metric is provided.

The present invention may be conveniently implemented using a conventional general purpose or a specialized digital computer or microprocessor programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a storage medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of embodiments of the present invention has been provided for the purposes of illustration and description. It is not intended to be exhaustive or to limit the invention to the precise forms disclosed. Many modifications and variations will be apparent to one of ordinary skill in the relevant arts. For example, steps preformed in the embodiments of the invention disclosed can be performed in alternate orders, certain steps can be omitted, and additional steps can be added. The embodiments were chosen and described in order to best explain the principles of the invention and its practical application, thereby enabling others skilled in the art to understand the invention for various embodiments and with various modifications that are suited to the particular used contemplated. It is intended that the scope of the invention be defined by the claims and their equivalents.

What is claimed is:

1. A system to synthesize custom metric attributes from a set of metric attributes associated with an application comprising:

a managed server instance in a domain, wherein the managed server instance includes a simple network management protocol (SNMP) Agent, an application having a sub-agent associated therewith, and a managed bean that exposes a set of metric attributes associated with the application, wherein the sub-agent is registered to the SNMP agent, and wherein the sub-agent receives the set of metric attributes associated with the application from the managed bean:

an administration server in the domain, wherein the administration server includes a SNMP manager that communicates with the SNMP agent on the managed server instance to receive the set of metric attributes;

a network management console having a view panel, wherein the view panel is capable of displaying for selection the set of metric attributes and a plurality of intrinsic attributes, wherein the set of metric attributes are used together with the plurality of intrinsic attributes to build a custom metric attribute, and wherein upon receiving, at the SNMP manager, the set of metric attributes from the SNMP Agent at the managed server instance, the view panel is used to build the custom metric attribute by selecting one or more of the set of metric attributes and one or more of the plurality of intrinsic attributes, and combining the selected one or more of the set of metric attributes with the one or more of the plurality of intrinsic attributes; and wherein the custom metric attribute is then available to one or more other managed server instances in the domain.

2. The system of claim 1 wherein a custom metric attribute is built using other custom metric attributes that have previously been built.

3. The system of claim 1 wherein the custom metric attribute is available to use to build other custom metric attributes.

4. The system of claim 1 further including a plurality of managed server instances in a domain, wherein each managed server instance includes a plurality of applications, each particular application having a sub-agent associated therewith, a SNMP Agent, and a managed bean that exposes a set of metric attributes associated with that particular application, wherein the set of metric attributes for the plurality of applications are communicated through SNMP by the SNMP Agent to the SNMP manager on the administration server.

5. The system of claim 3 wherein the set of metric attributes at the administration server for each of the plurality of applications is available to build a custom metric attribute.

6. The system of claim 1 wherein a custom metric attribute is built from two or more custom metric attributes, a plurality of intrinsic attributes, and a set of metric attributes associated with an application.

7. The system of claim 1 wherein the set of metric attributes are one of heap_size and current_heap_usage.

8. A method to synthesize custom metric attributes from a set of metric attributes associated with an application comprising the steps of:

providing a managed server instance in a domain, wherein the managed server instance includes a simple network management protocol SNMP Agent, an application having a sub-agent associated therewith, and a managed bean that exposes a set of metric attributes associated with the application, wherein the sub-agent receives the set of metric attributes associated with the application from the managed bean, and wherein the SNMP Agent receives the set of metric attributes from the sub-agent;

providing an administration server in the domain, wherein the administration server includes a SNMP manager that communicates with the SNMP Agent on the managed server instance, and a network management console having a view panel, wherein the view panel is capable of displaying for selection the set of metric attributes and a plurality of intrinsic attributes, and wherein the set of metric attributes are used together with the plurality of intrinsic attributes to build a custom metric attribute;

receiving, at the SNMP manager, the set of metric attributes from the SNMP Agent at the managed server instance, wherein the set of metric attributes are communicated from the SNMP manager to the network management console;

selecting one or more of the set of metric attributes and one or more of the plurality of intrinsic attributes from the view panel;

building the custom metric attribute in the view panel by combining the selected one or more of the set of metric attributes with the one or more of the plurality of intrinsic attributes; and wherein the custom metric attribute is then available to one or more other managed server instances in the domain.

9. The method of claim 8 wherein a custom metric attribute is built using other custom attributes that have previously been built.

10. The method of claim 8 wherein the custom metric attribute is available to use to build other custom metric attributes.

11. The method of claim 8 further including a plurality of managed server instances in a domain, wherein each managed server instance includes a plurality of applications, each particular application having a sub-agent associated therewith, a SNMP Agent, and a managed bean that exposes a set of metric attributes associated with that particular application, wherein the set of metric attributes for the plurality of applications are communicated through SNMP by the SNMP Agent to the SNMP manager on the administration server.

12. The method of claim 11 wherein the set of metric attributes at the administration server for each of the plurality of applications is available to build a custom metric attribute.

13. The method of claim 8 wherein a custom metric attribute is built from two or more custom metric attributes, a plurality of intrinsic attributes, and a set of metric attributes associated with an application.

14. The method of claim 8 wherein the set of metric attributes are one of heap_size and current_heap_usage.

15. A computer readable medium including instructions stored thereon for synthesizing custom metric attributes from a set of metric attributes associated with an application, wherein said instructions, when executed by one or more processors, cause the one or more processors to perform the steps of:

providing a managed server instance in a domain, wherein the managed server instance includes a simple network management protocol SNMP Agent, an application having a sub-agent associated therewith, and a managed bean that exposes a set of metric attributes associated with the application, wherein the sub-agent receives the set of metric attributes associated with the application from the managed bean, and wherein the SNMP Agent receives the set of metric attributes from the sub-agent;

providing an administration server in the domain, wherein the administration server includes a SNMP manager that communicates with the SNMP Agent on the managed server instance, and a network management console having a view panel, wherein the view panel is capable of displaying for selection the set of metric attributes and a plurality of intrinsic attributes, and wherein the set of metric attributes are used together with the plurality of intrinsic attributes to build a custom metric attribute;

receiving, at the SNMP manager, the set of metric attributes from the SNMP Agent at the managed server instance, wherein the set of metric attributes are communicated from the SNMP manager to the network management console;

selecting one or more of the set of metric attributes and one or more of the plurality of intrinsic attributes from the view panel;

building the custom metric attribute in the view panel by combining the selected one or more of the set of metric attributes with the one or more of the plurality of intrinsic attributes; and wherein the custom metric attribute is then available to one or more other managed server instances in the domain.

16. The computer readable medium of claim 15 wherein a custom metric attribute is built using other custom attributes that have previously been built.

17. The computer readable storage medium of claim 15 wherein the custom metric attribute is available to use to build other custom metric attributes.

18. The computer readable storage medium of claim 15 further including a plurality of managed server instances in a domain, wherein each managed server instance includes a plurality of applications, each particular application having a sub-agent associated therewith, a SNMP Agent, and a managed bean that exposes a set of metric attributes associated with that particular application, wherein the set of metric attributes for the plurality of applications are communicated through SNMP by the SNMP Agent to the SNMP manager on the administration server.

19. The computer readable storage medium of claim 18 wherein the set of metric attributes at the administration server for each of the plurality of applications is available to use to build a custom metric attribute.

20. The computer readable storage medium of claim 15 wherein a custom metric attribute is built from two or more custom metric attributes, a plurality of intrinsic attributes, and a set of metric attributes associated with an application.

* * * * *

UNITED STATES PATENT AND TRADEMARK OFFICE
CERTIFICATE OF CORRECTION

PATENT NO.        : 8,015,282 B2
APPLICATION NO.   : 12/354735
DATED             : September 6, 2011
INVENTOR(S)       : Inamdar et al.

Page 1 of 1

It is certified that error appears in the above-identified patent and that said Letters Patent is hereby corrected as shown below:

In Drawings

On Sheet 5 of 19, in figure 7, Box 181, line 1, delete "Se rver" and insert -- Server --, therefor.

On Sheet 5 of 19, in figure 7, Box 183, line 1, delete "S erver" and insert -- Server --, therefor.

On Sheet 5 of 19, in figure 7, Box 191, line 1, delete "S NMP" and insert -- SNMP --, therefor.

On Sheet 5 of 19, in figure 7, Box 191, line 3, delete "Se rver" and insert -- Server --, therefor.

On Sheet 5 of 19, in figure 9, Box 221, line 1, delete "Ser ver" and insert -- Server --, therefor.

On Sheet 7 of 19, in figure 9, Box 223, line 1, delete "differe nt" and insert -- different --, therefor.

On Sheet 9 of 19, in figure 11, Box 271, line 1, delete "MBe ans" and insert -- MBeans --, therefor.

In column 1, line 13, delete "hereby" and insert -- herein --, therefor.

In column 11, line 47, delete "and or" and insert -- and/or --, therefor.

In column 12, line 63, delete "bean:" and insert -- bean; --, therefor.

Signed and Sealed this
Sixth Day of December, 2011

David J. Kappos
*Director of the United States Patent and Trademark Office*